United States Patent Office 2,910,313
Patented Oct. 27, 1959

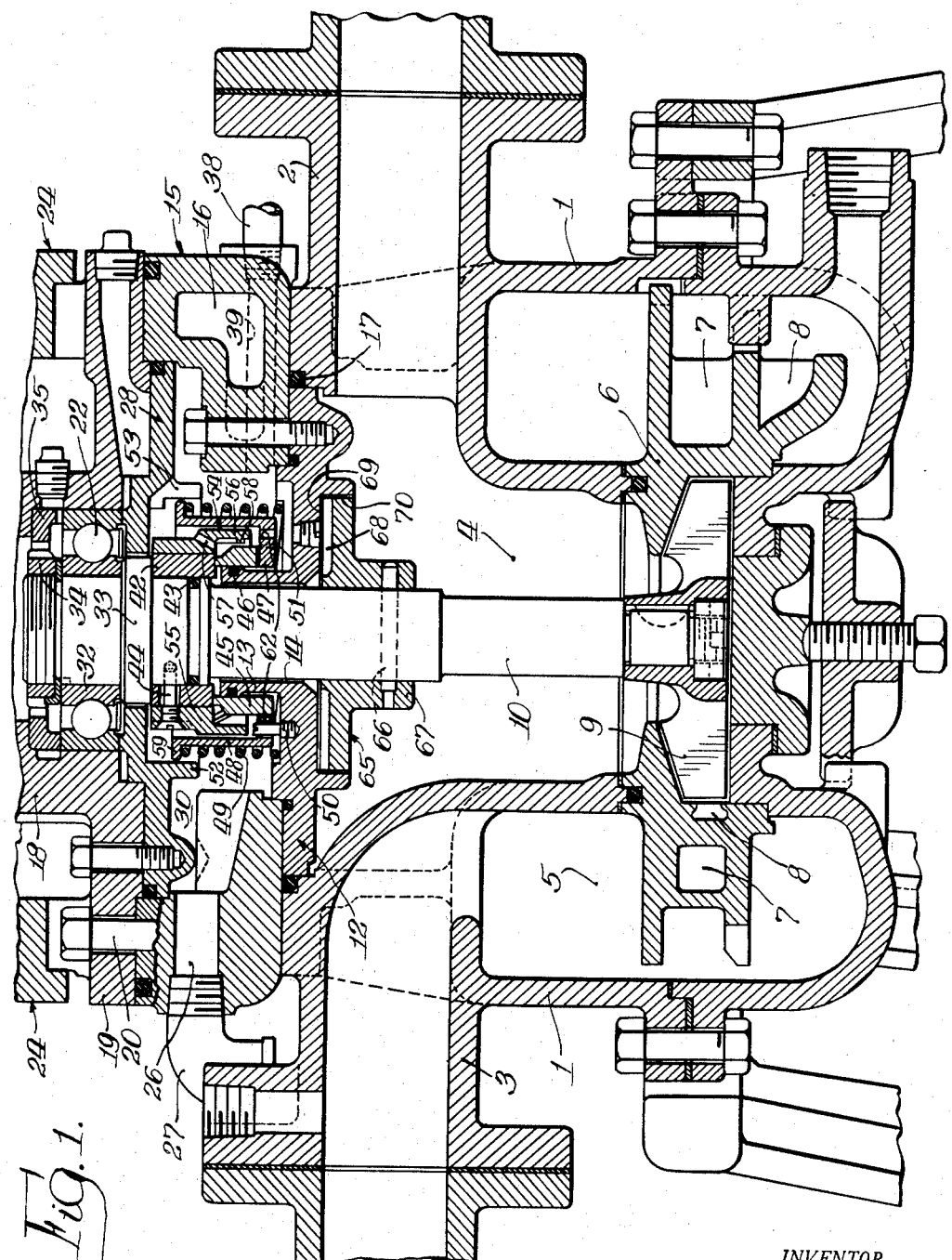

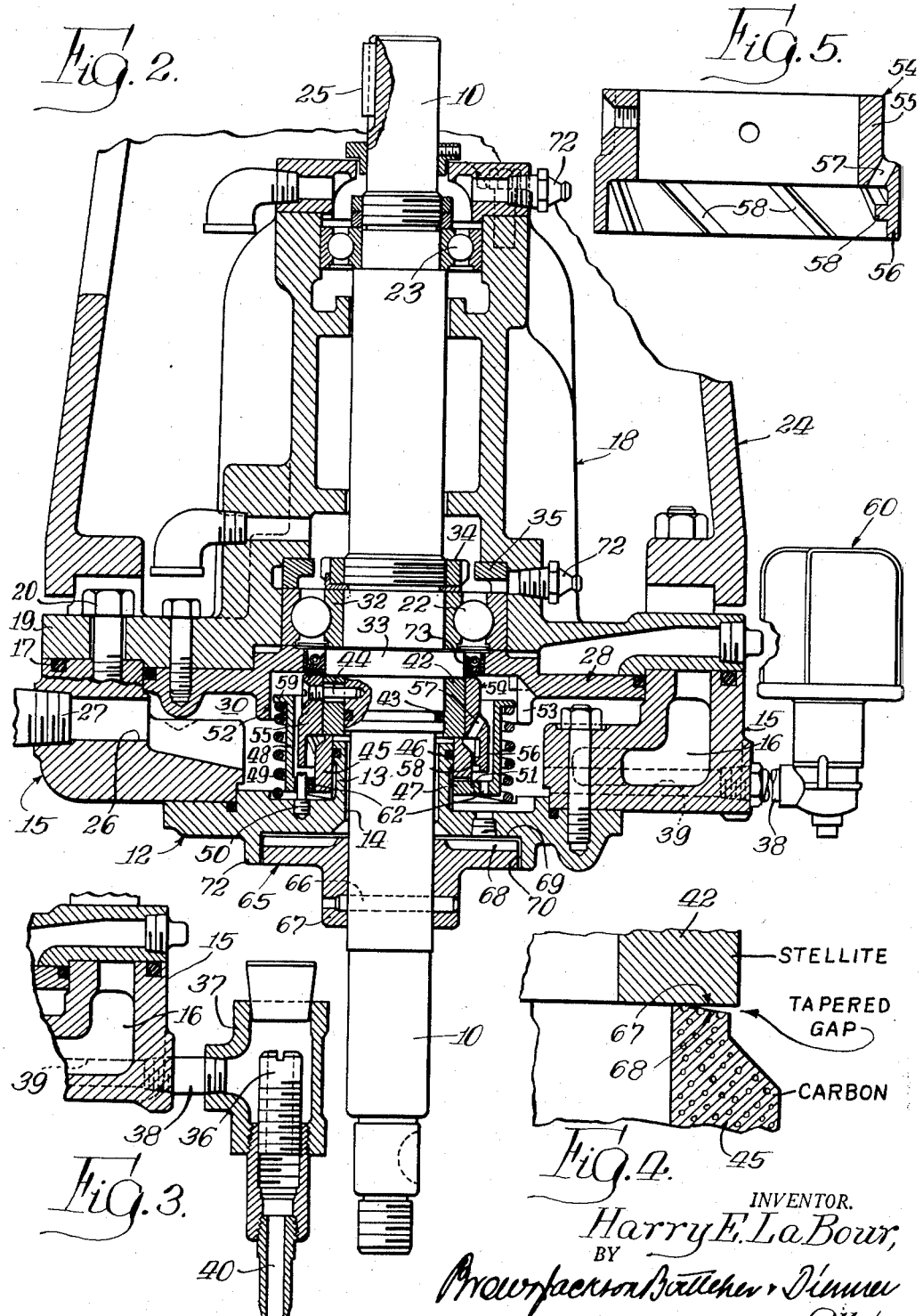

2,910,313

LUBRICATED SEAL FOR CENTRIFUGAL PUMP SHAFTS

Harry E. La Bour, Elkhart, Ind.

Application November 24, 1958, Serial No. 776,047

18 Claims. (Cl. 286—8)

This invention relates to lubricated seals for the shafts of centrifugal pumps and the like. It is applicable to centrifugal pumps which are self-priming as well as those which are not self-priming. It is applicable to pumps for chemical service as well as to pumps for general service.

The present application is a continuation-in-part of my copending applications, Serial No. 559,360, filed January 16, 1956, now abandoned, and Serial No. 626,886, filed December 7, 1956, now abandoned.

The most critical feature of a centrifugal pump, so far as servicing and continuity of operation is concerned, is the sealing of the shaft to the pump casing. A shaft seal for performing this function, if it is to have general applicability, must be able to remain tight under severe service conditions. Such conditions may include long continued operation, unfavorable character of liquids being pumped (such as corrosive liquids, volatile liquids, liquids carrying entrained solids or scale forming constituents, and the like), and receipt of only infrequent service. A seal to be applicable to general service should be of moderate first cost.

Numerous seals for centrifugal pumps have been proposed, but heretofore none which meets the above requirements has been devised. The hydraulic seal for self-priming centrifugal pumps disclosed in my prior Patent No. 2,381,823 comes as near the ideal as any so far proposed, but it adds cost to the pump, which the industry is not willing to pay. Also, it has certain drawbacks in that it is not suitable for handling liquids carrying a substantial amount of entrained solids.

There is a demand for a pump provided with such a seal that can be operated for a period of years with minimum service. In such situations it is desired to maintain the centrifugal pump in operation for a minimum period of years without being able to render any service to the shaft seal beyond supplying the same with lubricant. Consequently, there is a demand for a simple inexpensive shaft seal for centrifugal pumps which seal will operate satisfactorily in chemical or other service and with entrained solids, scale-forming materials and the like, and yet stay tight for a long time, with no more attention than periodic oiling. It is a chief object of this invention to provide a seal which will meet those requirements.

According to the preferred form of the present invention, the seal is formed of two rigid annular members, one of which is made of a hard wear resistant material, such as ceramic, stainless steel, Stellite and the like. This member is intended to wear but little and may advantageously be in the form of a ring. The cooperating annular member should be softer, so as to wear into conformity with the hard member, and it should be of a more or less self-lubricating character. Preferably, the ring member is carried on and sealed to the shaft and preferably the second member is in the form of a sleeve, sealed to the pump casing and adjustable for wear. Preferably, it is pressed against the hard member by means of a spring which permits the wear to be taken up. The spring, preferably a relatively large diameter compression spring, is mounted by means of a spring perch telescoping with the spring whereby the spring tends to pull the sleeve into contact with the ring with a high degree of stability.

The sleeve or softer member may be made of carbon or graphite or a combination of the same. Other materials of suitable character may be employed, as will be understood by reference to the specific disclosure of the preferred embodiment.

The ring and the sleeve engage each other in the axial direction. In the case of a vertical pump, the ring is sealed to and carried on the shaft above the sleeve. The sleeve is sealed to the pump casing, and is spring pressed upwardly against the ring. The spring pressure needs to be only moderate, and is not critical, particularly in the preferred embodiment where the ring and sleeve are held together by the internal suction of the pump.

The engaging surfaces are initially prepared by lapping the face of the hard ring member to a fine surface finish. The sleeve member is preferably faced square with the axis, so as to fit initially flat against the face of the ring member, and it is thereafter worn to a suitable running fit. In other words, the joint is initially formed on a plane which is at right angles to the axis of the two members and of the shaft. Initially, the surfaces of the two members may be provided with a film of lubricant, such as light machine oil, or various lubricating liquids, including water, but such film will, under rotation of the parts, tend to disappear and it must be renewed. In the preferred form of the invention, the inside of the sleeve and ring are subjected to the pressure produced in the intake passage of the pump adjacent the impeller. This pressure is generally below atmospheric, and preferably I provide means for maintaining the pressure on the inner side of the sleeve lower than atmospheric for reasons hereinafter explained in detail in connection with the specific embodiment.

According to my invention, the ring and sleeve which are initially engaging on a single transverse plane at the joint, will shortly after initiation of use exhibit a slight gap at the outer edge of the joint around the entire periphery. This is the product of wear. The outer periphery of the sleeve wears at a faster rate than the parts lying at less radius. Such action is understandable from the difference in circumferential travel or relative motion between the ring and sleeve. The hard ring suffers litte wear. The softer sleeve will show wear. The result of such wear is that the active face of the sleeve, instead of lying in a plane, lies on the surface of a very flat cone. The gap thereby produced when measured axially is greater at the outer edge and tapers to a minimum, i.e., to substantially nothing at the inner edge of the sleeve. A light machine oil or other lubricant will wet and creep along the surface of the carbon sleeve. It will generally not penetrate into the body of the sleeve to any appreciable extent, since the material of the sleeve is not porous but is vesicular. That is to say, there are no or substantially no continuous passageways through the walls of the sleeve which would permit oil to be drawn therethrough into the interior of the pump. But apparently the substance of the carbon sleeve consists of solids with interstices or vesicles in character like minute voids or bubbles. The vesicles which permeate the material of the sleeve are generally minute and occupy little of the volume. Such carbon material is usually produced from coke which is ground up and bonded together under pressure by means of tar or asphalt or other heavy carbonaceous binder. Then the material is baked. Baking drives out volatiles and to some extent produces destructive distillation of the binder, and forms gas which forms small bubbles in the body of the mass. Thereby the mass is full of minute voids which generally do not interconnect with each other or only to a limited extent. Consequently, when the face of the ring is machined off, some of these vesicles or cavities are cut open and form receptacles for the lubricant. The surface therefore presents generally the surface of a solid with minute pits or cavities communicating with the surface, but otherwise closed off from each other.

Now according to the present invention, the conical gap between the sleeve and the ring is constantly supplied with a small feed of oil which is caused to enter the gap and will then enter the pits or voids and also form a lubricating film between the parts. The particles of oil are rolled like minute rollers between the two surfaces, thereby holding them apart according to the well know theory of oil lubrication.

According to the present invention, the means for constantly supplying a film of oil to the outer edge of the joint to keep lubricant in the gap has these essential characteristics, namely, first, that the supply reservoir is separated from the joint by a vacuum break connection to atmosphere. Secondly, the delivery of oil from the reservoir to the joint opening or gap is so small or at so low a rate that the supply of liquid lubricant initially available will last a long time, even though the seal has developed a leak. Thereby, in case of leakage developing at the seal, it is possible to keep the pump operating without destroying the seal. The leakage tends to augment the inward flow of lubricant, but the rate at which lubricant can be withdrawn is limited by the means for supplying it. Thus, in case the seal develops a leak and internal suction tends to draw the lubricant through the leak into the interior of the pump, this inward leakage flow is limited by the fact that lubricant feeding means will deliver liquid lubricant into communication with the leak only at a low rate of delivery. Thereby the leak cannot cause escape of the lubricant any faster than the feeding means will allow. Third, the excess oil drains back into the reservoir.

According to the preferred embodiment of this invention, the immediate lubricant supply is held at a predetermined level below the seal joint in an open topped reservoir surrounding the seal. A rotating generally cylindrical lubricant elevator open at the top to atmospheric pressure to provide a vacuum break has a rim which reaches down to the surface of the liquid. Rotation of the rim of the elevator in contact with the surface of the liquid lubricant throws up a spray or mist inside as well as outside the confines of the elevator. This spray or mist on the inside strikes, settles or falls upon the seal parts. Some of it is thrown into the tapered gap of the joint, and the remainder of what settles upon or is thrown against the outside surfaces of the seal and adjacent parts runs down by gravity into the sump or reservoir. Preferably the lubricant is cooled by a water jacket as it returns to the sump or reservoir. The seal is thus constantly supplied with a small but continuous application of lubricant to keep lubricant in the tapered gap of the joint. If the seal should develop leakage, all that can be pulled through the joint into the pump liquid is that part of the applied lubricant that enters the edge of the joint from the atmospheric side. Since the top of the lubricant elevator is open to atmospheric pressure, and air can flow in freely, the suction acting through a leaky seal cannot pull liquid out of the reservoir, and it cannot suck any substantial amount of the spray or mist out of the interior of the elevator because of the vacuum break.

The present invention is preferably embodied in a vertical pump with the impeller shaft entering the pump casing from above. The invention, however, is not to be confined to this form. This permits the seal to be at the top of the pump and a pocket or recess is preferably formed on the inside of the seal to trap air in contact with the seal and to exclude the liquid being pumped from said pocket or recess. To keep liquid out of this pocket or recess, and to keep the pressure therein below atmospheric or below intake pressure, I provide a downwardly opening recess on the inside of the top wall of the pump casing, and concentric with the impeller shaft. In this recess, I dispose a balancing disk or rotor on the shaft, which disk or rotor acts to throw liquid out of the recess by centrifugal action and to keep the pressure in the recess and on the inside of the seal at a value lower than that of the pressure in the pump casing below said disk and its cooperating recess. This disk and cooperating recess are also of value in excluding solids entrained in the liquids being pumped from the seal. While the invention is preferably embodied in a vertical pump, the invention is not confined to that particular embodiment. The scope of the invention is to be determined from the appended claims.

An object of the present invention is to provide a self-lubricating mechanical seal for a centrifugal pump which seal will reliably apply lubricant to the wear surfaces but without the danger of suddenly exhausting the supply of lubricant. In case leakage should develop, it will proceed only very slowly, and will tend to give an indication for some time before the supply of lubricant can become exhausted.

A further important object of the invention is to provide a shaft seal for sealing the impeller shaft of a centrifugal pump to the intake wall of the pump casing by means of a mechanical seal consisting of two annular rigid seal members fitted and pressed together to form a tight running joint. One of these members is made of a material like carbon providing a relatively softer wear face which is or becomes equipped with a gap at the outer periphery, and the other being made of a hard wear and corrosion resisting material, such as ceramic, stainless steel, Stellite and the like. The joint is kept lubricated by means of a mist or spray of liquid lubricant applied to the outer edge of the joint. The inner edge of the joint is subject to being exposed to suction from the region of the intake of the pump casing, whereby the lubricant tends to travel inwardly of the joint to lubricate the engaging seal faces. This mode of applying the lubricant in a small but constant feed with a vacuum break connection between the seal and the supply reservoir is advantageous for other specific embodiments of mechanical seals for the impeller shafts of centrifugal pumps.

It is a further object of the invention to provide the impeller shaft of a centrifugal pump with a mechanical seal consisting of two substantially rigid wear members pressed together and meeting at a fluid tight running joint with a lubricating system therefor comprising a reservoir for liquid lubricant, and means for continuously spraying or otherwise conveying a small amount of lubricant from the reservoir to the said joint, and provision for the excess lubricant to drain back to the reservoir, there being a vacuum break between the joint and the reservoir to prevent reduced pressure on the inside of the seal from sucking the lubricant directly out of the reservoir particularly in case the joint should become leaky.

A further object is to provide the reservoir with a constant level maintaining supply means to keep the level in the reservoir substantially constant and thereby keeping the rate of delivery of lubricant to the seal by the delivery means substantially uniform.

A further object of the invention is to cool the lubricant reservoir and/or the parts over which the lubricant drains from the seal back to the reservoir in order to increase the effectiveness of the lubricant.

A further object is to provide means for making the delivery of the liquid lubricant to the seal joint in the form of a spray or mist. A further object is to employ as a lubricant elevating or transferring means a generally bell shaped or cylinder shaped spray producing member carried on the shaft and having its rim extending into contact with the liquid lubricant in the reservoir, said member being open at the top to atmospheric pressure to provide a vacuum break.

A further object is to confine the body of spray or mist to the region of the seal.

A further object is to house the spray producing means or the feeding means and the seal joint in a chamber which is closed except for a connection to atmosphere. This connection may serve also as a safety overflow or drain connection.

A further object of the invention is to embody the aforesaid form of seal in a vertical centrifugal pump with the seal joint disposed in a generally horizontal plane.

A further object is to provide the adjustable seal member with a large diameter spring of considerable length connected to the member by a spring perch which extends telescopically substantially beyond the adjacent engaged end of the member whereby the spring tends to stabilize the position of the member and tends to keep the pressure on the seal members substantially uniform, although wear occurs.

A further object is to provide a seal protecting and pressure reducing rotor on the shaft of the pump and to dispose the same in a recess adjacent the seal and on the inside of the pump casing for creating a reduction in fluid pressure on the inside of the seal and for excluding liquids and entrained solids from the region of the seal.

A further object is to form an air pocket in the inner end of the seal and to keep the liquid being pumped out of said pocket by the action of said rotor while the pump is in operation.

Now in order to acquaint those skilled in the art with the manner of constructing and operating my invention, I shall describe in connection with the accompanying drawings a specific embodiment of the invention. It is to be remembered, however, that the true scope of the invention is to be determined from the appended claims.

In the accompanying drawings:

Figure 1 is a vertical axial section through a vertical self-priming pump embodying the seal of my invention;

Figure 2 is a vertical longitudinal axial section showing the seal and related parts applied to the shaft and the mechanical mounting of the shaft. The lubricant supply of this figure differs from that of Figure 1;

Figure 3 is a fragmentary detail view showing a modified form of liquid level maintaining means for keeping the level of liquid in the reservoir of Figure 1 substantially constant under a continuous inflow of lubricant;

Figure 4 is a fragmentary section, more or less in diagram, to illustrate in exaggerated form the tapered gap between the two wear members of the seal; and Figure 5 is a vertical axial section through the lubricant elevator.

Referring now to Figure 1, the pump body 1 consists of a more or less cylindrical body with a vertical axis having a horizontally extending flanged inlet neck 2 and a similarly flanged outlet neck 3 for connection to inlet pipe and discharge pipe, respectively. An appropriate valve may be connected in the discharge pipe and a suitable screen in the intake pipe if desired. The pump shown is of the type of vertical self-priming pumps shown in my prior patent No. 2,381,824, of August 7, 1945, in which the inlet chamber 4 is concentric with the discharge chamber 5, and the impeller chamber and throating which comprises multiple pairs of throats, as will be understood from Figure 4 of said prior patent, are carried in a separate impeller housing and throating member 6, which throating has two pairs of passageways each pair comprising an anterior discharge passageway 7 and a posterior priming and discharge passageway 8, which latter operates during priming for reentry of liquid for reentry of liquid from the separator chamber 5 to re-admit liquid into the periphery of the impeller 9, but wherein the direction of flow is reversed as soon as liquid is drawn over into the intake chamber 4.

The pump shown is a self-priming pump, but it is to be understood that the body, throating and impeller may be widely varied, and may be priming or non-priming, as desired. Suffice it to say that in the normal operation of the pump, the impeller 9, which is mounted on the shaft 10, produces suction in the intake space 4. Figure 2 shows the shaft and seal parts mounted in a cover plate for the body. The parts shown in Figure 2 may be applied to any other body and to any corresponding impeller.

The cover plate forms part of a compound structure made in a number of pieces for facility of manufacture and assembly. The plate 12 is a circular plate with a central aperture 14, and it has an upstanding flange 13 surrounding the said aperture 14. The plate 12 is bolted to the adapter ring 15 which comprises a water jacket having a water passageway 16 communicating with water inlet and outlet connections, not shown, for cooling the liquid lubricant, which preferably is oil. The periphery of the plate 12 is sealed as by an O-ring 17 to the upper inner periphery of the inlet space 4 of the pump body 1. The flat bottom of the adapter ring 15 is bolted to the top face of the body 1 which is provided with an annular flat seat for receiving the said adapter ring 15. A bearing bracket 18 has an annular flange 19 bolted as at 20 to the top of the adapter ring 15. This bearing bracket 18 carries the lower ball bearing 22, and as will be seen in Figure 1, for radial and axial load the upper ball bearing 23 for supporting the upper end of the shaft 10 against radial load. A motor mounting bracket 24 for mounting a driving motor (not shown) connected to the upper end of the shaft 10 by a coupling with a spline 25 is clamped to the top of the bearing bracket flange 19.

The water passageway 16 of the water jacket extends throughout the greater part of the circumference of the said ring 15. There is an interruption between the inlet and the outlet through which a radial opening 26 communicates through the street L-connection 27 to form a vent to atmosphere. The top of the adapter ring 15 is closed by the centrally apertured plate 28 which is sealed to the inner periphery of the ring member 15 near its top and to the bearing bracket 19. This plate 28 is bolted to the bottom of the bearing bracket 18 at the flange 19. An annular space 30 around the shaft 10 and its connected parts is formed by the plate 12 at the bottom, plate 28 at the top, and the adapter ring 15 peripherally of them and between them. This space 30 is open to atmosphere through th vent 26, 27. The vent 26, 27 provides a vacuum break for the oil feeding means. At the same time, the passageway 26 and the L 27 provide an overflow connection in the event that an excess of liquid should accumulate in the said space 30.

The shaft 10 is supported for axial and radial load by means of the bearing 22, the inner race 32 of which is clamped between the flange 33 and the nut 34. The outer race is clamped between the plate 28 and a spacer ring 35 set in the end of the bearing bore formed in the bracket 18. The particular arrangement shown in Figure 1 for lubricating the upper and lower bearings 23, 22 involves the use of an elevated lubricant reservoir (not shown) with control means for supplying a light oil to the upper and lower bearings during operation of the pump, and allowing the said oil to drain down through the bearings and into the bottom of the said lubricating chamber 30. A suitable gap is formed between the flange 33 on the shaft 10 and the walls of the opening in the upper plate 28, so that oil descending through the bearing 22 flows between the shaft and the plate and down into the space 30. Here it tends to fill the bottom of the space 30 to a level which is determined by an overflow dam 36 shown in Figure 3. The overflow dam 36 is in the form of a nipple which is adjustable in height held in a T-fitting 37 connected by a horizontal nipple 38 and passageway 39 to the inside of the ring 15, so as to communicate with the space 30. This connection through the pipe 38 and through the passageway 39 is made at a point which does not interfere with the water passage 16.

The oil which descends through the bearing 22 into the space 30 and gravitates to the bottom of the same will tend to run out through the nipple 38, and can do so only when it attains the level predetermined by the position of the top of the nipple 36 which forms the adjustable dam for outflow of lubricant. The overflow at the fitting 36 runs out through pipe 40 to drain. The top of the T-fitting 37 is open to atmosphere through a screen plug which excludes foreign matter.

The shaft 10 has mounted thereon below the flange 33 a sealing ring 42 of Stellite which is sealed to the shaft by an O-ring 43 and keyed to the shaft by means of the screw 44 which is threaded into the hub 55 of oil elevator 54, and has a reduced end projecting into a recess in shaft 10 and extending through a slot in the said ring 42. Said ring 42 is a hard metal ring of a corrosion resistant alloy, such as Stellite, but it may be a ring of less expensive metal faced with a hard metal on its lower radial surface. This ring 42 may be made of ceramic. A cooperating sealing sleeve 45 of hard baked carbon surrounds the neck or flange 13 and is sealed thereto by the O-ring 46. The lower end of the said sleeve 45 is notched or castellated to receive inwardly projecting fingers of rectangular cross section extending radially inwardly and meshing with the rectangular recesses or notches in the said sleeve 45, the said fingers and recesses or notches forming an interdigitation whereby the spring perch 48, which is spaced radially from the said ring 42 and sleeve 45, under the influence of a relatively long and relatively large diameter wire coil spring 49, is pressed upwardly against the rotatable sealing ring 42 to maintain a tight joint. Any reduction in fluid pressure inside the seal tends to work in the same direction as the spring 49 in holding the sleeve 45 in contact with the ring 42, but in the construction shown, this effect is negligible.

The lower end of the spring perch 48 has an inwardly extending flange 51 from which the fingers 47 extend into the notches in the lower end of the sealing sleeve 45. A pin 50 threaded into a hole in the upper face of the plate 12 extends loosely through a registering opening 62 in the said flange 51 of the spring perch 48 to key these two parts together to prevent rotation of the spring perch 48 and yet to allow of motion of said spring perch 48 and sleeve 45 in a direction axially of the shaft 10. Said flange 51 has a series of openings 62 to provide communication between the inside of the spring perch 48 and the bottom of the reservoir which comprises the lower part of the annular enclosed space 30. The reservoir is an annular sump or trap for retaining liquid lubricant below the level of the dam 36 in the fitting 37 for the embodiment of Figure 1. In the embodiment of Figure 2, the reservoir is supplied with liquid lubricant from a constant level supply means, such as an automatic constant level lubricator 60 which keeps the liquid up to a certain level in the annular reservoir. The passage 26 and elbow 27 at all times provide an overflow outlet if for some reason the level of liquid in the space 30 should rise that high.

The said spring perch 48 has a radially outwardly extending flange 59 at its upper end for engaging the upper end of the spring 49 and for guiding the axial travel of said spring perch 48 inside the flange 52. The lower end of the spring 49 rests upon the surface of the plate 12. Thereby the spring is guided on the said spring perch. The upper end of the spring perch member 48 is guided longitudinally inside of a circular depending flange 52 on the plate 28. The said flange 52 is notched or slotted at 53 to provide free communication of atmospheric pressure to the inside of the spring perch 48 and the parts within the same.

In the annular space between the barrel of the said spring perch 48 and the sealing ring 42 and sleeve 45 there is disposed the oil elevator member 54, which comprises a hub member 55 closely embracing the ring member 42 and keyed to the shaft 10 by the screw 44 which, as previously explained, passes loosely through the slot in the ring 42. The said screw 44 is threaded into the hub of the oil elevator 54, and has its inner cylindrical end projecting through the said slot and into a recess in the shaft 10. This locates the oil elevator with reference to the shaft and serves as a keying member to key the sealing ring 42 to the shaft. The oil elevator has a skirt member 56 which is of an internal diameter larger than that of the hub portion 55 so as to clear the sleeve 45 on the inside and of an external diameter such as to lie out of contact with the inside of the barrel of the spring perch 48. This skirt may, for example, be of an external diameter of 3.375". This dimension is stated purely as an example and is not to be regarded as a limitation. One or more pressure equalizing passages 57 extend through the wall of the said elevator member 54 at spaced points around the periphery of the said elevator member at the junction of the hub and the skirt portions. On the inside cylindrical surface of the skirt 56, there are disposed helical ribs 58 which are driven in a direction such that the lower end leads in the direction of rotation, whereby the moving rib tends to raise liquid from a lower level and throw it upwardly and circumferentially. In the embodiment of Figures 1 and 3, liquid lubricant is automatically fed to the bearings 23—22 from an elevated reservoir (not shown) while the pump is running as by means of a magnet valve (not shown) in well known manner. So far as the seal of the present invention is concerned, any means for providing a suitable running supply of oil to keep the level of oil in the reservoir at the level of the dam 36 will serve the purpose. The oil passes down through the bearings 23, 22 and collects in the reservoir which is formed in the bottom of the space 30. Since the passageway 39 and nipple 38 lead from the reservoir to the overflow dam 36, oil will accumulate in the bottom of space 30 only up to the level of the said dam 36, and further inflow of oil into the space 30 will then drain off over the dam 36. The level which the dam 36 retains is slightly above the bottom of the skirt 56 of the oil elevator 54. In other words, when the parts are quiescent, the lower end of the skirt 56 will dip slightly below the surface of the static oil level. The oil is free to flow in and out of the space inside the spring perch 48 through the openings 62 shown in Figure 2 in one of which openings the pin 50 lies. They provide free in and out passage for oil in the reservoir, which is constituted by the plate 12 and the adapter ring 15, and the integral neck or flange 13 surrounding the central hole in the said plate 12. The oil in said reservoir is subdivided by the barrel of the spring perch 48 and the sealing ring 45. The annular space between these parts includes a small amount of oil which is in free communication with the main part of the reservoir through the said openings 62. This subdivision limits the disturbance which the oil elevator creates in the said body of oil. The top of the said annular space above the oil level communicates with the top of the space in the lubricating chamber through slot 53 and with atmosphere through the passageway 26 and elbow 27.

As the said oil elevator 54 rotates in the direction such that the inclined ribs 58 tend to carry oil upward and circumferentially, this oil is sprayed and churned into a fine state of subdivision. The spray or mist which is thereby created is thrown upwardly, and bathes the joint or meeting of the ring 42 and sleeve 45 around the entire circumference with the liquid lubricant. Some of such sprayed oil tends to enter the open gap or crack at the outer periphery of the joint. In operation, some of this mist or spray will be thrown out through the equalizer openings 57, but such excess is largely confined by the barrel of the spring perch 48 and associated parts. At all events, it tends to drain back into the reservoir formed in the bottom of the space 30. The shaft 10 of the pump will normally be operated at a motor speed of from about 1150 r.p.m. to about 3450 r.p.m. and at speeds in this range the said oil elevator operates satisfactorily to transfer oil from the solid body of oil in the reservoir to the circumference of the joint between the ring and the sleeve. The excess drains back to the reservoir and is cooled by the water jacket in the adapter ring 15 which is in thermal contact with the oil in the reservoir.

On the shaft 10 and on the inside of the wall enclosing the intake space 4 of the pump, I provide a balancing disk 65 which has a hub 67 mounted on the shaft and is pinned thereto by the pin 66. This disk 65 has a series of radial blades 68 formed on its upper surface. These blades lie closely adjacent the lower surface of a circular recess defined by the flat horizontal wall 69 formed on the bottom of the plate 12 and the cylindrical surface 70 formed on the inside of the depending annular flange member 72 which provides a recess in which the said balancing or equalizing disk 65 operates. The recess or pocket in which the balancing disk 65 is disposed communicates with the space between the shaft 10 and the surrounding flange or neck 13, and thus with the inside of the seal joint.

The operation of the pump shown in Figure 1, by itself and aside from the seal, is of known type. Liquid is trapped in the discharge trap or space 5, and in the intake space or intake trap 4 to a level which gives a sufficient priming charge. When the shaft 10 is operated, the impeller 9 drives the liquid out through the primary and secondary throats 7, 7 and 8, 8 until air enters the impeller, whereupon the ability to develop discharge pressure is reduced and liquid reenters the impeller peripherally through the secondary or priming throats 8, 8 to entrain air and to form a mixture through which priming is effected. The mixture is discharged from the impeller chamber, and is broken down into liquid and gas in the separator 5, the liquid reentering the impeller through the priming throats 8, 8 to be thus recirculated until sufficient liquid enters by way of the intake passageway 4 to reverse the flow in the secondary throats 8, 8 and thereupon delivery of the pumped liquid is initiated.

Any liquid which tends to enter between the shaft and the flange or neck 13 on the plate 12 first must encounter the balancing disk 65 and its blades 68 which tend to throw any liquid out tangentially and expel the same from the top face and periphery of the disk. This balancing disk thereby tends to keep the liquid being pumped out of contact with the sealing ring and sleeve 42, 45, and particularly it excludes entrained solids or other undesired material from the region of the seal. Air or other gas normally occupies the space on the inside of the seal above the balancing disk 65 and will tend to remain there when the pump is shut down. In the event that there is positive pressure on the intake, the air tends to be trapped in that location.

The construction of the seal parts 42, 45 involves the initial formation of a good fit. For this purpose, the ring 42 is lapped carefully to provide a finished planar surface 67 at right angles to the axis of the said ring and its supporting shaft 10. The carbon sleeve 45 has its upper or working surface faced off at right angles to its longitudinal axis, which axis is also substantially that of the shaft 10.

The substance of the Stellite sleeve 42 is a dense metallic structure. The structure of the carbon sleeve 45 is that of a solid material having, however, vesicles or minute interstices or bubbles throughout the body of the same indicated by the small circles in Figure 4, which indication is, however, purely diagrammatic. These small interstices or vesicles are generally quite minute, but they are scattered throughout the body of the said sleeve. They are generally barely visible or invisible to the unaided eye. When the sleeve which is originally moulded and baked is cut so that its engaging end surface is squared off to engage the ring 42, the contact between the surface of the ring 42 and the surface of the carbon sleeve 45 will then be an annular area in a plane at right angles to the axis of the two engaging parts.

The carbon sleeve is relatively soft with respect to the Stellite or ceramic ring 42 and upon putting the parts into operation, that is, by rotating the ring 42 in contact with the sleeve 45, wear begins to occur even though the parts are initially lubricated by a film of lubricant. Such lubricant as will have been deposited on the surface and in the open pits or recesses formed in the face cannot be readily renewed if there is actual contact throughout the full annular area, and particularly at the outer margin of the engagement of the sleeve and ring.

Preferably, the outermost edge of the ring 42 extends radially slightly beyond and overhangs the outermost edge of the working face of the sleeve. This extending overhang tends to be impacted by the upward spray of liquid produced by the spinning elevator 54. The parts 42 and 45 are first fitted together so that their engaging faces lie substantially in a common plane, that is, their faces are parallel and in engagement with each other. The rotary motion of the member 42 will produce a greater degree of wear at a greater radius of engagement, with the result that the relatively soft carbon sleeve 45 will tend to wear away more at its outer periphery than at its inner periphery. This is affected by the eccentricity or wobble of the shaft 10 in its bearings since absolute accuracy is not attainable in practice. This initial wear reveals itself in the darkening of the oil with suspended carbon. Thereafter the oil remains relatively clear. The active surface 68, as shown in Figure 4, then approaches the form of the cone. This produces a tapered gap which is shown diagrammatically in exaggerated form in Figure 4. The gap or crack is very minute, but it is nevertheless effective in facilitating the entry of oil between the two engaging surfaces. The outer edge of the ring 42 overhangs the outer edge of the sleeve 45 in a radial direction, so that the oil which is thrown up in a spray or mist tends to strike the overhanging edge and be projected into the tapered gap. This matter of overhang is a refinement which is not essential, but nevertheless it is beneficial.

The body of the carbon sleeve 45 is not only softer than the Stellite ring 42, but it also contains the vesicles or interstices above mentioned which, when intersected by machining the surface, provide minute pits or recesses which tend to hold oil and feed out the same as required. The oil wets and creeps along the surface of the carbon quite readily. The result is a constant replenishing of oil to the surfaces 67, 68 by the spray or mist delivered by the elevator all around the periphery of the joint, and consequently a continuous lubrication. The capillary pits or recesses which open onto the surface receive and hold lubricant immediately available.

If the joint should develop a tendency to leak, the amount of oil which can be drawn in by suction to the inside of the seal is no more than what is supplied at the region of leakage by the spray. The body of oil in the reservoir cannot be sucked in as a continuous mass in through the leak because the said reservoir of oil is not in direct communication with the joint between the members 42 and 45 and a vacuum break connection to atmosphere prevents. Hence, a leak at the seal cannot suddenly drain the oil out at one gulp, as would be the case if the body of oil were in direct communication with the joint. Thus, if any leak should develop at the joint, it would be a slow leak of oil, and would give an indication of oil being passed into the pumped liquid, so that a warning would be given well in advance of depletion of the oil supply or serious contamination of the pumped liquid with a slug of oil, as would be the case if the same could be drawn over as a continuous body.

The oil from the reservoir in the bottom of the space 30 cannot be pulled over by suction on the inside as a continuous body because of the vacuum break which this construction provides. Assume, for example, that because of a leak at the joint between the ring 42 and the sleeve 45, suction should be applied to the inside of the skirt 56 of the oil elevator 54. Such suction would be unable to lift liquid from below in view of the access of air at atmospheric pressure or substantially atmospheric pressure through the openings 57 which lead out into the main part of the space 30 through the slot 53 shown as cut through the guiding flange 52 surrounding the spring perch member 48. This outer part of the space 30 communicates with atmosphere through the passageway 26 and the elbow 27 as above explained. In other words, there is a vacuum break connection to atmosphere, leading directly to the joint and opening directly to the top of the liquid in the reservoir, the level of which liquid lies below the joint between the parts 42, 45. The liquid elevator continuously raises liquid lubricant from said lower level in small amounts and applies the same to the outer edge of the joints between the seal members. The delivery of the spray or mist directly to the edge of the joint where the tapered gap exists is highly beneficial in insuring lubrication. The wetting effect of the liquid lubricant on the surface assists in introducing the liquid lubricant, no matter what the pressure conditions inside and outside of the joint may be. The seal appears to be made chiefly on the inner periphery where the wear is less than on the outer periphery of the joint. While most conditions in the operation of centrifugal pumps will involve suction on the inside of the joint, the lubricated seal of my invention will operate with a certain amount of internal pressure on the joint. In some pump installations, the internal fluid pressure may vary between positive and negative head on the intake. The seal of my invention will perform satisfactorily under such conditions. Positive head on the intake can be tolerated if it is not too high and particularly if it does not result in the liquid itself or its contents interfering with lubrication of the seal members. The balancing disk will tend to reduce any pressure of the liquid in the space 4 relative to the inside of the joint. Hence, even if there is a positive head on the intake connection 2 of the pump, its effect may be lowered substantially or even reversed by the said balancing disk 65. It is preferable to have reduced pressure on the inside of the seal joint and atmospheric pressure on the outside, and normally that will be the condition in the usual pump installation for pumps used in general or chemical service.

In Figure 2 the means for lubricating the shaft 10 are grease nipples 72, 72, the application and use of which are well understood by those skilled in the art. Sealing rings 73 are employed between the lower bearing 22 and the lubricating chamber 30 to exclude grease introduced into the bearings 22 from being delivered into the said lubricating chamber. In that case, the liquid level in the reservoir in the bottom of the said lubricating chamber 30 is maintained as by the constant level oil supply device 60 or any other suitable means for supplying lubricant to the reservoir at a certain predetermined level. That level lies slightly above the bottom of the elevator skirt 56.

The liquid lubricant, while it is preferably light machine oil for general purposes, may be any special liquid which will serve the purpose, even including water, where the circumstances require the same. The presence of the water jacket for cooling the seal is beneficial, but not essential to the broader aspects of my invention.

I do not intend to be limited to the details shown and described, except as they are made essential by the appended claims.

I claim:

1. In a shaft seal for a centrifugal pump having an inlet space, a vertical impeller shaft, a seal plate disposed substantially horizontally, said plate having an opening through which the shaft extends, said plate having walls providing an annular oil reservoir around said opening, said oil reservoir being separated from said opening by an annular ridge which defines one side of said annular oil reservoir, an annular seal member sealed to the plate about said opening, a cooperating annular seal member sealed to the shaft and carried thereby, means for yieldably urging said seal members into engagement to maintain a tight joint, and an oil elevator attached to the shaft and extending over said annular ridge into said reservoir, said oil elevator having means rendered active by rotation of said shaft for raising oil over said annular ridge to lubricate the bearing of said seal members against each other, an adapter ring connected to said seal plate, a pump casing having an annular wall engaging the lower face of said adapter ring, said latter annular wall and said seal plate defining a part of the inlet space of the pump casing.

2. In combination in a vertical centrifugal pump having a casing with a substantially horizontal wall forming part of the intake passageway of the pump, and having a shaft receiving opening, an impeller shaft extending through said opening, annular sealing members on said casing and said shaft respectively having sealing faces pressed yieldably in engagement with each other, there being a depression in the upper surface of said horizontal wall forming an oil reservoir, and means activated by rotation of said shaft for circulating a small flow of oil between said reservoir and the sealing members to lubricate said engaging seal faces.

3. In combination a pump casing, a vertical shaft, a transverse seal plate forming a part of said pump casing and having an opening therein for receiving said shaft, a stationary seal member mounted on said plate about said opening, a movable seal member on said shaft engaging said stationary seal member, means on said plate providing an annular oil reservoir surrounding said shaft and out of communication with said seal members, and an oil distributing member actuated by movement of the shaft for transferring oil in the form of spray from said reservoir to said seal members, said seal plate defining a part of the intake space of the pump casing, whereby the inside of said seal members is in communication with said intake space.

4. In a hydraulic centrifugal pump having a pump casing including a wall which forms part of the inlet space of said pump, said wall having a shaft receiving opening, an impeller shaft extending through said opening, a mechanical shaft seal comprising a rigid sealing member connected to the wall about said opening and a cooperating rigid sealing member connected with the shaft and engaging said first sealing member, means for resiliently pressing said members into sealing engagement, wall means cooperating with the inlet wall to define a lubricating chamber enclosing said seal and adjacent parts of said shaft; said chamber being adapted to retain a pool of lubricating liquid below the seal, and means carried on and actuated by movement of said shaft for elevating liquid lubricant from said pool into contact with said sealing members at their engaging surfaces.

5. In a centrifugal pump having a horizontally extending intake wall, a vertical shaft extending through the wall, a mechanical seal for sealing the shaft to the wall having an atmospheric side and a side exposed to the intake, and means actuated by rotation of the shaft for producing a spray of oil in contact with the atmospheric side of the mechanical seal.

6. In a centrifugal pump, a wall forming on its inside a part of an intake passageway of the pump, an impeller shaft extending through said wall, a mechanical seal between the shaft and the wall, walls defining a lubricating chamber vented to atmosphere and disposed about said seal and defining an oil reservoir in the bottom of the chamber but separate from the mechanical seal, whereby leakage of the mechanical seal will not permit suction from the intake passageway to suck oil from the reservoir, and an oil elevator on the shaft extending into contact with the oil in the reservoir to produce a spray of oil in the lubricating chamber that lubricates the seal.

7. In a centrifugal pump having an intake passageway, a substantially horizontal wall the lower side of which forms part of said intake passageway, a vertical impeller shaft extending through said wall, a mechanical seal between said wall and said shaft, walls cooperating with said first named wall defining an atmospherically vented lubricating chamber about said seal, and defining an oil reservoir in the bottom of said chamber, said oil reservoir being separate from said seal wherebly leakage of the seal will not permit suction from the intake passageway to suck oil out of the reservoir, means outside the lubricating chamber and communicating with the reservoir for maintaining a predetermined level to produce a spray of oil in said lubricating chamber to lubricate said seal.

8. In a centrifugal pump having an intake passageway, a generally horizontally extending wall the lower surface of which defines a part of said passageway, a vertical impeller shaft extending through said wall, a mechanical seal between said wall and said shaft, walls cooperating with said first named wall defining an atmospherically vented lubricating chamber about said seal and defining an annular oil reservoir around the shaft in the bottom of said chamber, oil supply means external to the chamber and communicating with the reservoir for maintaining a predetermined level of oil in the reservoir, said reservoir being separate from said seal whereby leakage of the seal will not permit suction from the intake passageway to suck the oil out of said reservoir and deplete the oil supply, a bell shaped oil elevator on the shaft, said elevator having a peripheral flange dipping into the oil in the reservoir, and upon rotation of the shaft producing an oil spray which lubricates the seal, and an annular wall extending around said peripheral flange and above the predetermined level of oil for confining the spray of oil produced by said elevator.

9. The combination of claim 4 wherein one of said cooperating rigid sealing members is formed of a relatively soft material having numerous capillary recesses on its engaging face to receive liquid lubricant and hold it at the joint.

10. The combination of claim 5 wherein the mechanical seal comprises a hard wear resisting member mounted on the shaft, and a softer member adjustably mounted on the wall, said softer member having numerous recesses on its engaging face to receive liquid lubricant and hold it at the interface between said members.

11. In a shaft seal for the impeller shaft of a vertical centrifugal pump having a cooperating casing wall, a pair of annular wear members sealed to said shaft and to said wall respectively, spring means pressing said wear members into engagement to produce a running joint, means on the shaft inside the casing for producing a reduction in fluid pressure on the inside of said seal, which reduction in fluid pressure tends to suck liquid lubricant inward at the joint, one of said wear members being formed of a relatively soft material having numerous capillary recesses on its engaging face, a reservoir for liquid lubricant formed as an open annular channel about said shaft, means to maintain a predetermined level of lubricant in said channel, a substantially cylindrical lubricant conveyor carried concentrically on the shaft with its lower rim extending to the surface of liquid lubricant in the reservoir and surrounding said seal joint, the spray of lubricant formed inside said lubricant conveyor contacting said joint, the upper part of said conveyor being open to atmospheric pressure to provide a vacuum break between the joint and the reservoir.

12. In a centrifugal pump a casing having a wall defining in part the intake space of the pump, an impeller shaft extending substantially vertically through said wall, a sealing ring carried on and sealed to the shaft, a sealing sleeve mounted on and sealed to the wall, a substantially cylindrical spring mount having a radially outwardly extending flange at its outer end, and radially inwardly extending flange comprising fingers at its inner end said sleeve having notches at its inner end for engaging with said fingers, a coil spring surrounding said mount and engaging said first named flange said sealing sleeve being held in sealing engagement with said ring by said spring, and an oil elevator comprising an axially extending rim portion projecting into the space between said sleeve and said spring mount, and means for admitting oil at substantially a constant level into said space for contact with said rim portion of the elevator.

13. In combination, a substantially horizontal plate having an opening, means providing an upstanding annular flange about said opening, a shaft extending through the opening, said shaft having a sealing ring, a sealing sleeve guided on and sealed to said flange, and having rubbing contact with said ring, said plate having means in the form of an annular outer wall spaced from said annular flange with an annular space between the said annular wall and said annular flange forming a reservoir for trapping a body of lubricant, an annular loading member comprising a cylindrical body having at one end a radially outwardly extending flange forming a perch for a loading spring for urging the sealing sleeve and ring together to form a tight joint, said loading member having at its opposite end a radially inwardly extending flange having endwise engagement with the sealing sleeve, and a prestressed compression spring lying radially outside the cylindrical body of the loading member and bearing against said outwardly extending flange and tending to pull inwardly extending flange longitudinally of the shaft against the end of the sealing sleeve, and an oil elevator mounted on and extending lengthwise of the shaft into the lubricant reservoir to contact the body of lubricant therein, said elevator being disposed radially inside said spring.

14. In a device of the class described, a pump casing wall having an opening for an impeller shaft, a bearing bracket having a wall substantially parallel with and registering with said first wall, an impeller shaft having bearings mounted on said bearing bracket wall and extending through said opening in the first wall, and an annular ringlike spacing member between said walls and defining a chamber, an annular wear member mounted on and sealed to the shaft, an annular wear member mounted on the wall and sealed to the margins about said opening, one of said wear members being in the form of a sleeve movable endwise on its mount, a loading ring disposed telescopically with respect to said sleeve and comprising a cylindrical body having a radially inwardly extending flange engaging endwise against the sleeve, said loading ring body having a radially outwardly extending flange forming a spring perch, and a prestressed compression spring engaging endwise against one of said walls and against said outwardly extending flange and being telescopically disposed relative to the cylindrical body of the loading ring whereby the pressure of the spring is applied as a pull upon the end of the sleevelike wear member to hold it in engagement with the cooperating wear member.

15. In combination, a horizontal plate having an opening therein, a vertical rotatable shaft extending through said opening, sealing means for sealing the rotatable shaft to the margins of the opening to maintain a seal between them, said plate having means providing an annular oil reservoir embracing said opening, said reservoir being open at the top, an oil elevator mounted on the shaft and extending into said oil reservoir to raise oil out of the reservoir and to deliver some of it to the sealing means when said shaft is rotated, the lower side of said plate having a downwardly extending cylindrical recess concentric with and communicating with said opening and of a diameter substantially larger than that of said opening, and a rotor member on said shaft fitting radially and axially into said cylindrical recess and tending to reduce the entrance of liquid into the opening from below by centrifugal force when the shaft is rotated.

16. In a pump having a casing with an intake wall, an impeller shaft extending through said wall and adapted to be sealed thereto, a pair of seal members comprising a relatively hard annular seal member carried on the shaft and a relatively soft annular member carried on and sealed to the wall, spring means for pressing the members together to form a joint, said relatively soft annular member tending to wear away on its working face faster at its outer periphery than at its inner periphery whereby entry of lubricant between said members is facilitated, means operated by the shaft inside the pump casing to cause reduction in fluid pressure on the inside of the joint, an oil reservoir, and means outside the pump casing operated by the shaft for splashing oil from the reservoir upon the outside edge of the joint.

17. The combination of claim 16 wherein said relatively soft annular seal member is made of a material which is relatively non-porous and which has numerous capillary recesses on its working face.

18. The combination of claim 16 wherein said relatively soft annular member is made of baked carbon containing minute vesicles throughout its mass.

References Cited in the file of this patent

UNITED STATES PATENTS

| | | |
|---|---|---|
| 1,815,096 | Cedervall | July 21, 1931 |
| 2,023,898 | Olson | Dec. 10, 1935 |
| 2,043,885 | Davidson | June 9, 1936 |
| 2,066,505 | Wolfe | Jan. 5, 1937 |
| 2,108,760 | Weiher | Feb. 15, 1938 |
| 2,220,771 | McHugh | Nov. 5, 1940 |
| 2,331,641 | Walker | Oct. 12, 1943 |